United States Patent [19]

Muller

[11] Patent Number: 4,706,140
[45] Date of Patent: Nov. 10, 1987

[54] MAGNETIC TAPE THREADING APPARATUS

[75] Inventor: Johannes C. A. Muller, Eindhoven, Netherlands

[73] Assignee: U.S. Philips Corporation, New York, N.Y.

[21] Appl. No.: 793,887

[22] Filed: Nov. 1, 1985

[30] Foreign Application Priority Data

Apr. 9, 1985 [NL] Netherlands .................. 8501027

[51] Int. Cl.$^4$ .......................................... G11B 15/665
[52] U.S. Cl. ................................................. 360/85
[58] Field of Search ........................................ 360/85

[56] References Cited

U.S. PATENT DOCUMENTS 3,673,348  6/1972  Larkin ................................. 360/85
4,045,820  8/1977  Staar ................................... 360/85
4,264,937  4/1981  Kabacinski ........................... 360/85

Primary Examiner—Robert S. Tupper
Attorney, Agent, or Firm—F. Brice Faller

[57] ABSTRACT

A magnetic-tape apparatus comprises a deck (1) carrying the cylindrical drum system (3), which is provided with at least one rotating magnetic head (7). A supporting member (31) mounted on the deck (1) for rectilinear movement towards and away from the drum system (3) and has at least two mutually spaced tape guides (73 to 76) fixed thereto. By a movement of the supporting member (31) towards the drum system (3) a length of magnetic tape (84) is led to the drum system and is wrapped around a part of the circumference of the drum system. There is provided at least one positioning element (77) which forms part of a non-rotating drum section (4) which positions the tape guides (73 to 76) relative to the drum system (3) in the end position of the supporting member (31) by cooperating with projecting portions (31d) thereof.

10 Claims, 12 Drawing Figures

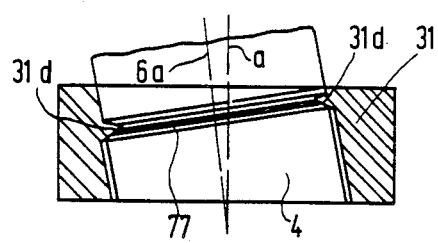
FIG. 9
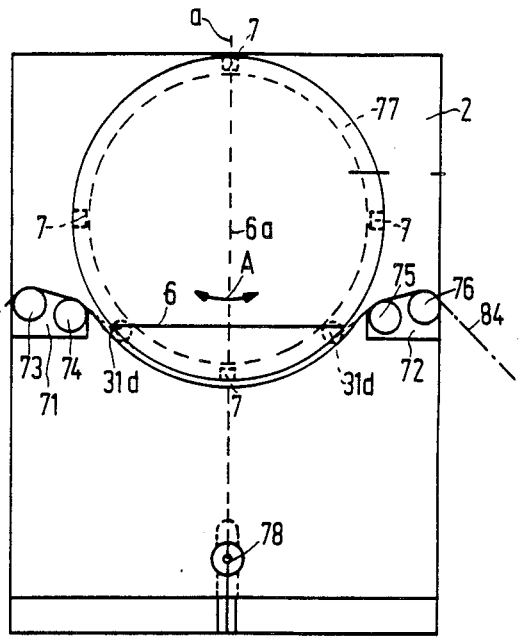
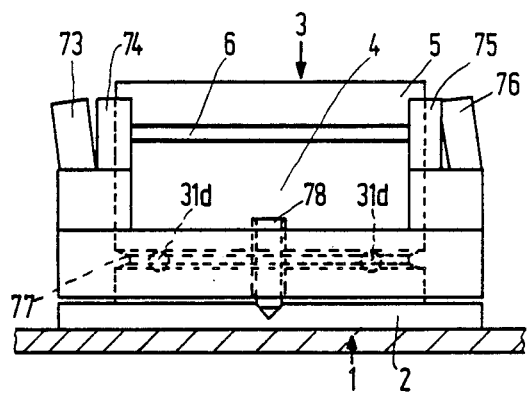
FIG. 10
FIG. 11
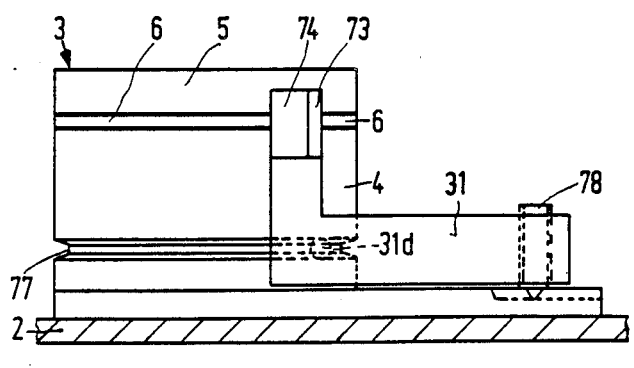
FIG. 12

MAGNETIC TAPE THREADING APPARATUS

BACKGROUND OF THE INVENTION

The invention relates to a magnetic-tape threading apparatus comprising a deck carrying a cylindrical drum system provided with at least one rotating magnetic head, on which deck a supporting member carrying at least two mutually spaced tape guides is guided for rectilinear movement towards and away from the drum system, movement of the supporting member towards the drum system causes a length of magentic tape to be led towards the drum system, after which movement, when the supporting member is in an end position, the magnetic tape is wrapped around a part of the circumference of the drum system by the tape guides. When the supporting member is in the end position, the tape guides are positioned relative to the drum system by at least one positioning element.

A magnetic-tape apparatus of this kind is disclosed in U.S. Pat. No. 3,512,694. In this known apparatus the tape guides which wrap the magnetic tape around the circumference of the drum system are resiliently connected to the supporting member by means of blade springs. In order to ensure a sufficiently accurate transport of the tape around the drum system, which is necessary in such an apparatus because of the very small width of the tracks recorded on the magnetic tape, the drum system should be positioned accurately on the deck. The deck further carries positioning elements which position the tape guides accurately in the end position of the supporting member after the length of magnetic tape has been wrapped around the circumference of the drum system and after flexure of the blade springs. For a correct positioning of the drum system and the two tape guides relative to one another both the drum system and the positioning elements should be mounted accurately on the deck and, in addition, the deck must have a high rigidity and dimensional stability. Despite this accurate mounting of the drum system and the positioning elements on the deck, tolerances between these parts are liable to give rise to positioning errors, so that these tolerances necessitate further adjustments of the parts relative to each other. As a result of this, it is comparatively intricate to position the tape guides relative to the drum system in the known magnetic tape apparatus, so that even in the case of mass production the known apparatus is comparatively expensive.

SUMMARY OF THE INVENTION

It is the object of the invention to provide an accurate and simple positioning of the tape guides relative to the drum system in a magnetic-tape apparatus by directly coupling the drum system and the supporting member.

To this end the tape guides are rigidly connected to the supporting member, the positioning element forms part of a non-rotating drum section of the drum system, and the supporting member carries positioning means which abut against the positioning element to position the tape guides relative to the drum system in the end position of the supporting member.

Thus, in the end position of the supporting member the positioning means on the supporting member are connected directly to the positioning element arranged on a stationary part of the drum system. Since the positioning means are rigidly connected to the tape guides this direct connection enables an accurate positioning of the tape guides relative to the drum system to be obtained. The direct connection results in the positioning tolerances of the various parts being cancelled effectively. Thus, the construction in accordance with the invention enables a correct positioning, which is maintained even after prolonged use, to be obtained in a simple and rapid manner. Therefore, this construction is very suitable for use in cheap mass-produced apparatuses.

The positioning means can have two projecting portions on the front side of the supporting member which faces the drum system. The positioning element can be constructed as a recess in the outer wall of the non-rotating drum section, which recess is engaged by the projecting portions in the end position of the supporting member. As a result of this construction the projecting portions can directly engage the recess in the outer wall of the drum section at the end of the movement of the supporting member towards the end position. The construction ensures that the positioning means and the positioning element can be coupled smoothly to each other and enables a correct positioning of the tape guides relative to the drum system to be obtained.

The projecting portions and the recess are prism-shaped for a correct and smooth positioning of the tape guides relative to the drum system.

In an easy-to-realize embodiment the recess is a circumferential groove in the outer wall of the non-rotating drum section. Such a circumferential groove can be formed simply yet accurately in the outer wall of the drum section.

When the drum system comprises a lower drum and an upper drum, the non-rotating drum section of the drum system, of which the positioning element forms part, can be the lower drum. Thus, the lower drum is employed for positioning the tape guides. This is advantageous because the supporting member and the lower drum can easily be arranged at substantially the same level relative to the deck.

When the supporting member is constituted by a sliding plate, the front side of the sliding plate which faces the drum system can have a curved wall which is substantially concentric with the drum system and which carries the projecting portions. In the end position of the sliding plate the concentrically curved wall enables this plate to be positioned at the shortest possible distance from the drum system, so that the projecting portions project only a comparatively small distance from the curved wall of the sliding plate. This enables a comparatively compact construction to be obtained.

In the end position of sliding plate the projection portions can be urged into the recess under spring force so that in the end position of the sliding plate the projecting portions correctly engage against the walls of the recess and that the tape guides and the drum system are accurately positioned relative to each other.

At the rear side which is remote from the drum system the sliding plate can carry an adjusting member by means of which the sliding plate, when in its end position, is pivotable about a connecting line between the projecting portions. In this way it is possible to correct the tape path, if necessary, by tilting the sliding plate about this connecting line.

The sliding plate can be an integrated unit with the projecting portions and the tape guides, which unit is manufactured from a thermosetting plastics. The use of an integrated unit, whose shape is defined by the mould, ensures that the positions of the projecting portions and the tape guides relative to each other are defined accurately without necessitating any further operations.

BRIEF DESCRIPTION OF THE DRAWING

FIG. 9 shows the apparatus on another scale in a partly sectional view taken on the lines IX—IX in FIG. 7;

FIG. 10 is a schematic plan view on another scale showing the apparatus of FIG. 1 in the normal operating position but showing the drum system and the tape guides in other positions than in FIG. 1;

FIG. 11 is a schematic view taken on the line XI in FIG. 10;

FIG. 12 is a schematic view taken on the line XII in FIG. 10.

DETAILED DESCRIPTION OF THE PREFERRED EMBODIMENTS

Figure 1:
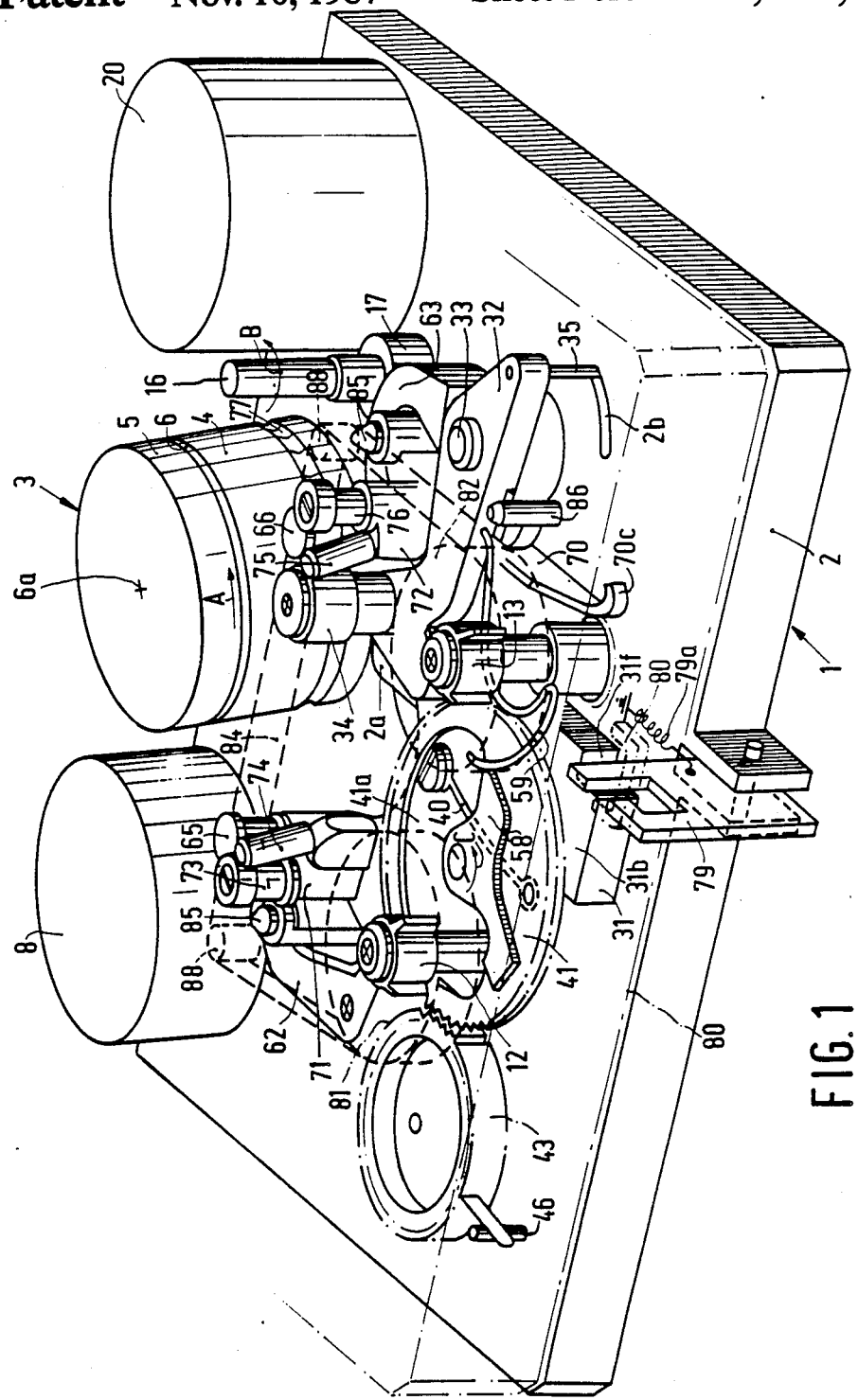
FIG. 1 is a perspective view in which the magnetic tape is shown schematically and in which the apparatus is in the stop position.

The magnetic-tape apparatus shown in FIG. 1 has a deck 1 which comprises a comparatively rigid deck plate 2 at the upper side of the apparatus. The deck plate 2 carries a cylindrical drum system 3, which comprises two stationary drum sections constituted by a lower drum 4 and an upper drum 5 (see also FIGS. 10 and 11). A head disk 6 is mounted for rotation between the lower drum and the upper drum and carries four magnetic heads 7 (see FIG. 10). The axis of the lower drum 4 and the upper drum 5 coincides with the axis of rotation 6a of the head disk 6. The axis of rotation 6a is inclined relaive to the deck plate 2. The head disk 6 is driven by means of a motor 8, which is arranged beside the drum system 3 and whose motor shaft 8a (FIG. 3) is connected to a pulley 9 underneath the deck plate 2. The axis of the motor shaft 8a extends parallel to the axis of rotation 6a. A belt 10 is passed over the pulley 9 and over another pulley 11 which is fixedly connected to the shaft of the head disk 6. The normal direction of rotation of the head disk 6 is as indicated by the arrow A.

It is to be noted that alternatively the upper drum 5 may carry the magnetic heads 7 and may be rotatable about the axis of rotation 6a. In that case the head disk 6 may be dispensed with.

Figure 2:
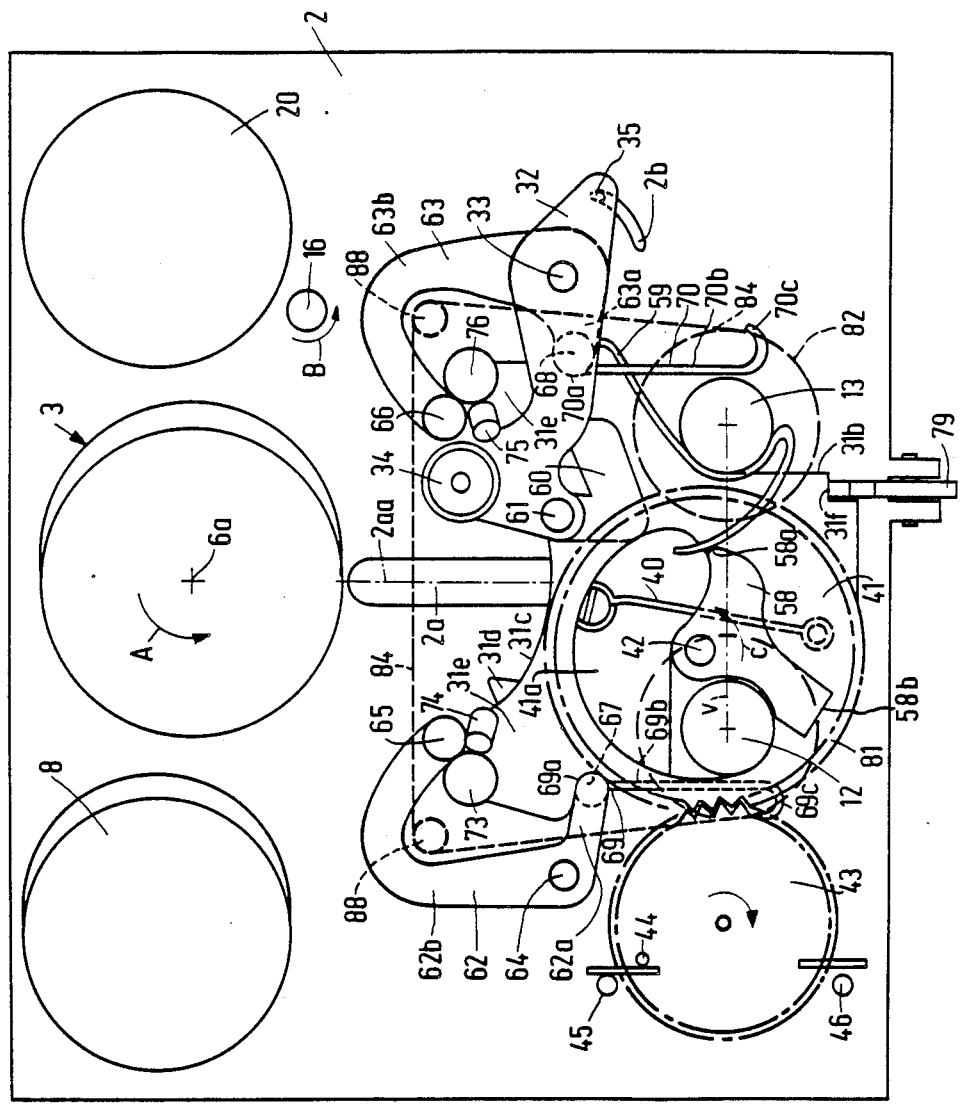
FIG. 2 is a plan view on another scale, showing the apparatus of FIG. 1 in the stop position.
Figure 3:
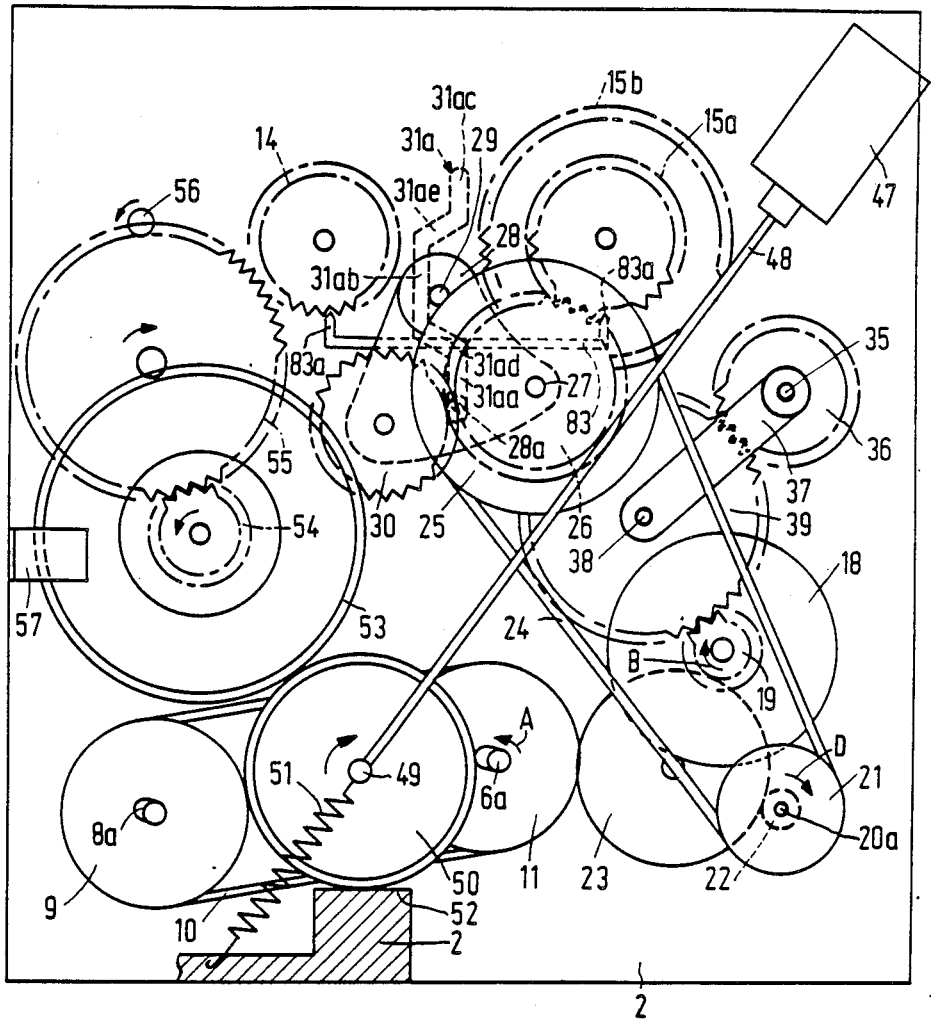
FIG. 3 is an underneath view on another scale, showing the apparatus of FIG. 1 in the stop position.

Two mutually spaced winding spindles 12 and 13 are situated above the dock plate 2 and, viewed in the plan view of FIG. 2, they are arranged substantially on the base vertices of an isosceles triangle whose apex is defined by the axis of rotation 6a. The winding spindles 12 and 13 are mounted for rotation on journals which are secured to the deck plate 2. Referring to FIG. 3, winding spindles 12 and 13 are connected to a fast-wind idler 14 and to a fast wind-idler 15a and a normal-mode idler 15b respectively. The normal-mode idler 15b is connected to the winding spindle 13 by means of a friction clutch in the customary manner. It is to be noted that the idlers 14 and 15a, 15b are coaxial with the winding spindles 12 and 13 respectively and their axes extend perpendicularly to the major surface of the deck plate 2. This applies also to the axis of rotation of a capstan 16 which projects from the deck plate 2. The capstan 16 (FIG. 1) is journalled in a bearing bush 17 on a deck plate 2 and underneath the deck plate 2 it is rigidly connected to a flywheel 18 and to a gear wheel 19 (FIG. 3). For driving the capstan 16 a drive motor 20 arranged beside the drum system 3 has a motor shaft 20a carrying a pulley 21 and a gear wheel 22 underneath the deck plate 2. The gear wheel 22 drives the capstan 16 via an idler 23 in the direction indicated by the arrow B.

Referring to FIG. 3, a belt 24 is passed over the pulley 21 and a pulley 25 which is rigidly connected to a gear wheel 26. The pulley 25 and the gear wheel 26 are journaled on a shaft 27 fixed to a coupling plate 28 which is pivotable about a spindle 29 fixed to the deck plate. Further, a gear wheel 30, which is in mesh with the gear wheel 26, is journalled in the coupling plate 28.

Figure 5:
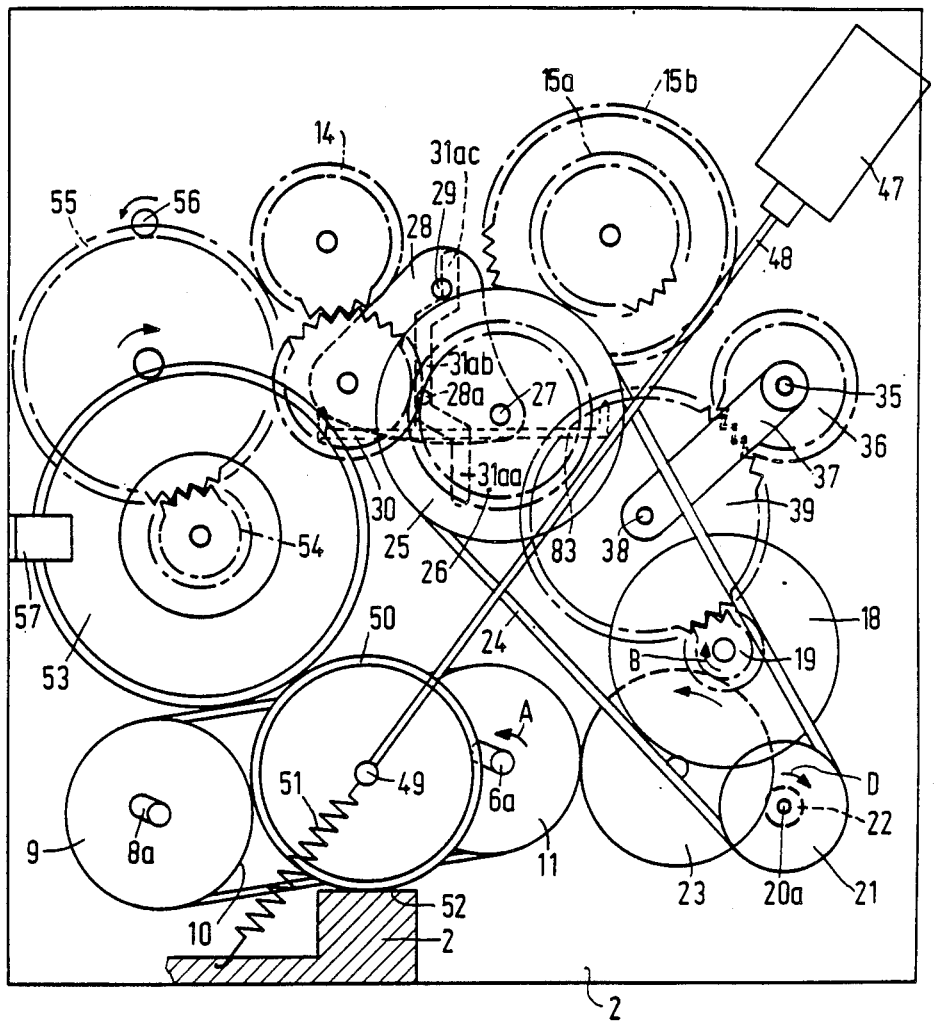
FIG. 5 is an underneath view similar to FIG. 3, showing the apparatus in the same fast-wind position as in FIG. 4.
Figure 6:
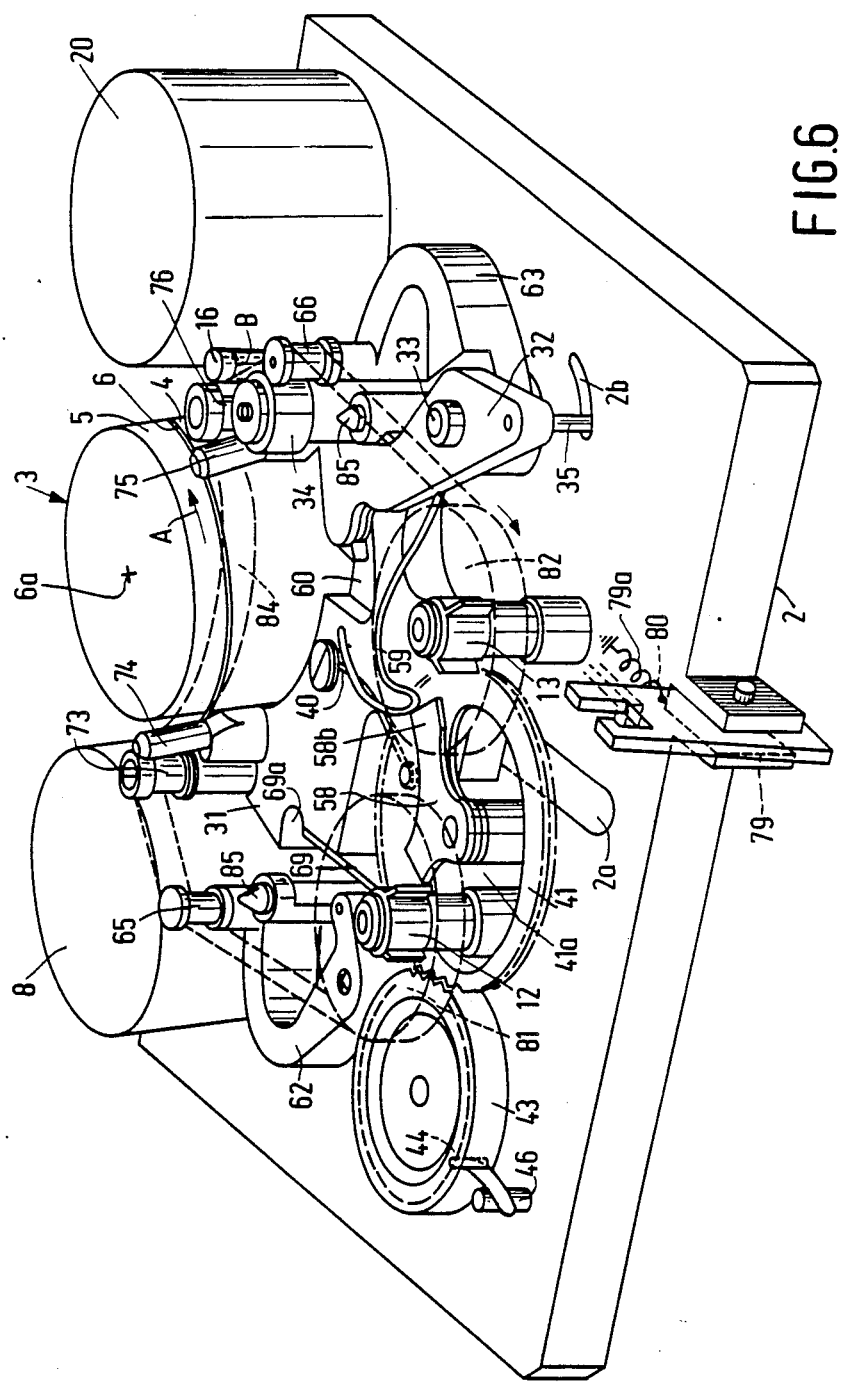
FIG. 6 is a perspective view similar to FIG. 1, showing the magnetic-tape apparatus in the normal operating position.
Figure 8:
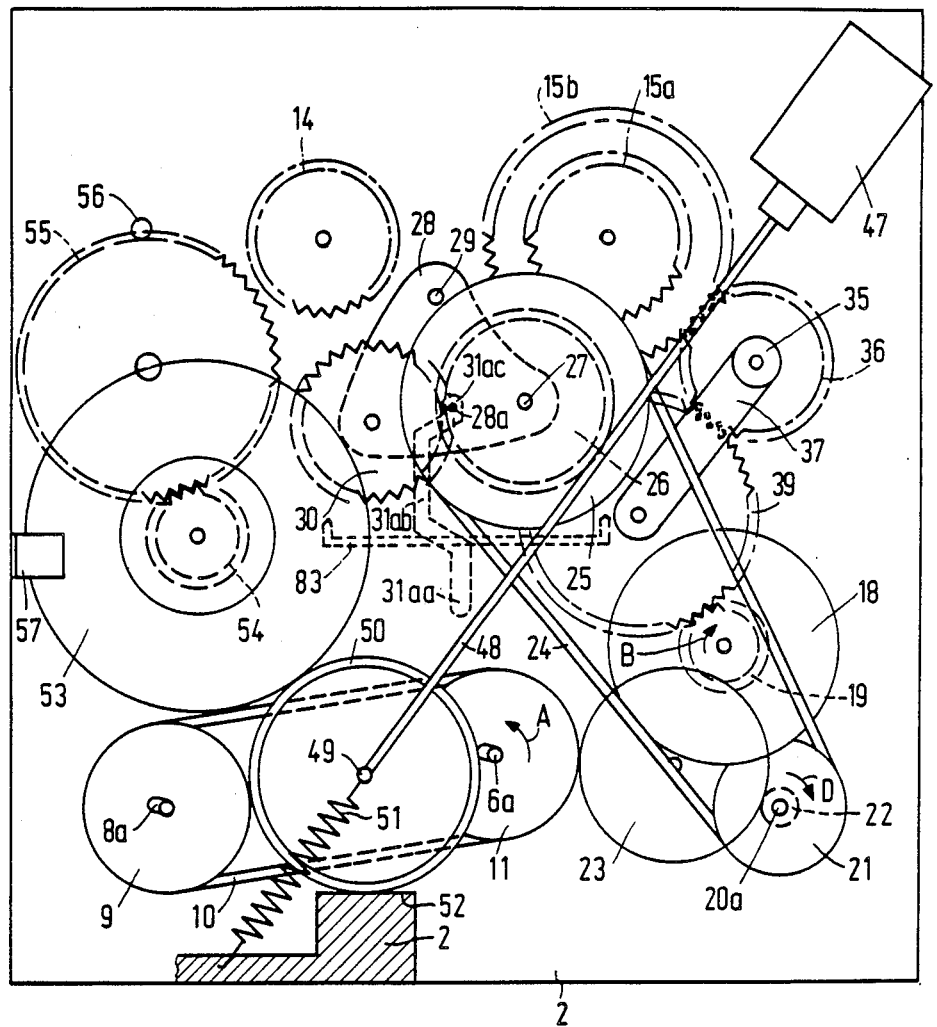
FIG. 8 is an underneath view similar to FIGS. 3 and 5 but showing the apparatus in the normal operating position.

Referring to FIGS. 1 and 2, the upper surface of the deck plate 2 carries a supporting member in the form of a sliding plate 31 which is rectilinearly slidable in a direction perpendicular to a connecting line v between the axes of rotation of the winding spindles 12 and 13 and is guided in the deck plate 2 in a slot 2a whose longitudinal axis 2aa extends perpendicularly to connecting line v. Referring also to FIG. 3, a pin 28a fixed to coupling plate 28 extends through the slot 2a and is guided in a groove 31a in the lower wall of the sliding plate 31. Groove 31a serves as a control means for controlling the coupling plate 28 during the movement of the sliding plate 31 away from or towards the drum sytem 3. As is shown in FIGS. 3, 5 and 8 the pin 28a may be situated in a branch 31aa (FIG. 3), in a branch 31ab (FIG. 5) or in a branch 31ac (FIG. 8). All these three branches extend perpendicularly to the longitudinal axis 2aa of the slot 2a, the axis of the branch 31ab being situated to the left of the axis 29 viewed in FIG. 3, the axis of the branch 31ac being situated to the right of the axis 29, and the axis of the branch 31aa being situated slightly further to the right of the axis 29. An oblique branch 31ad is situated between the branches 31aa and 31ab and an oblique branch 31ae is situated between the branches 31ab and 31ac. In the stop position of the apparatus as shown in FIG. 3 the pin 28a is situated in the right-most branch 31aa, so that the coupling plate 28 is in such a position that the gear wheel 26 is coupled to the fast-wind idler 15a. By moving the sliding plate 31 over a comparatively short distance towards the drum system 3 the gear wheel 26 remains coupled to the fast-wind idler 15a and by moving the sliding plate 31 slightly further towards the drum system the pin 28a enters the branch 31ab, as a result of which the coupling plate 28 is pivoted about the spindle 29 into the position shown in FIG. 5, in which the gear wheel 30 is in mesh with the fast-wind idler 14 and the gear wheel 26 has become disengaged from the fast-wind idler 15a. Finally, by a movement of the pin 28a in the branch 31ac the coupling plate 28 can be moved into a position in which both the gear wheel 26 and the gear wheel 30 are disengaged from the other wheels (FIG. 8).

Referring to FIG. 1, pressure-roller lever 32 is pivotable about a pivot 33 on the upper side of the deck plate 2. The pressure-roller lever 32 is constructed as a two-arm lever and at the free end of one of its arms it carries a pressure roller 34. Another arm of the lever 32 carries a pin 35 at its free end, which pin is movable in a slot 2b in the deck plate 2. As is shown in FIG. 3 the pin 35 carries a gear wheel 36 underneath the deck plate 2 and the pin is mounted on the end portion of an arm 37. The other end of the arm 37 is journaled on shaft 38 by means of which the arm 37 is pivotable relative to the deck plate 2. A gear wheel 39 is rotatable about the shaft 38 and is in mesh with the gear wheel 36 and also with the gear wheel 19. When the pressure-roller lever 32 is pivoted the arm 37 is also pivoted via the pin 35, the arm 37 being pivotable from a position shown in FIG. 3 to a position shown in FIG. 8, in which the gear wheel 36 is in mesh with the normal-mode idler 15b. In this way the motor 21 can drive the fast-wind idler 14, the fast-wind idler 15a, or the normal-mode idler 15b.

Figure 4:
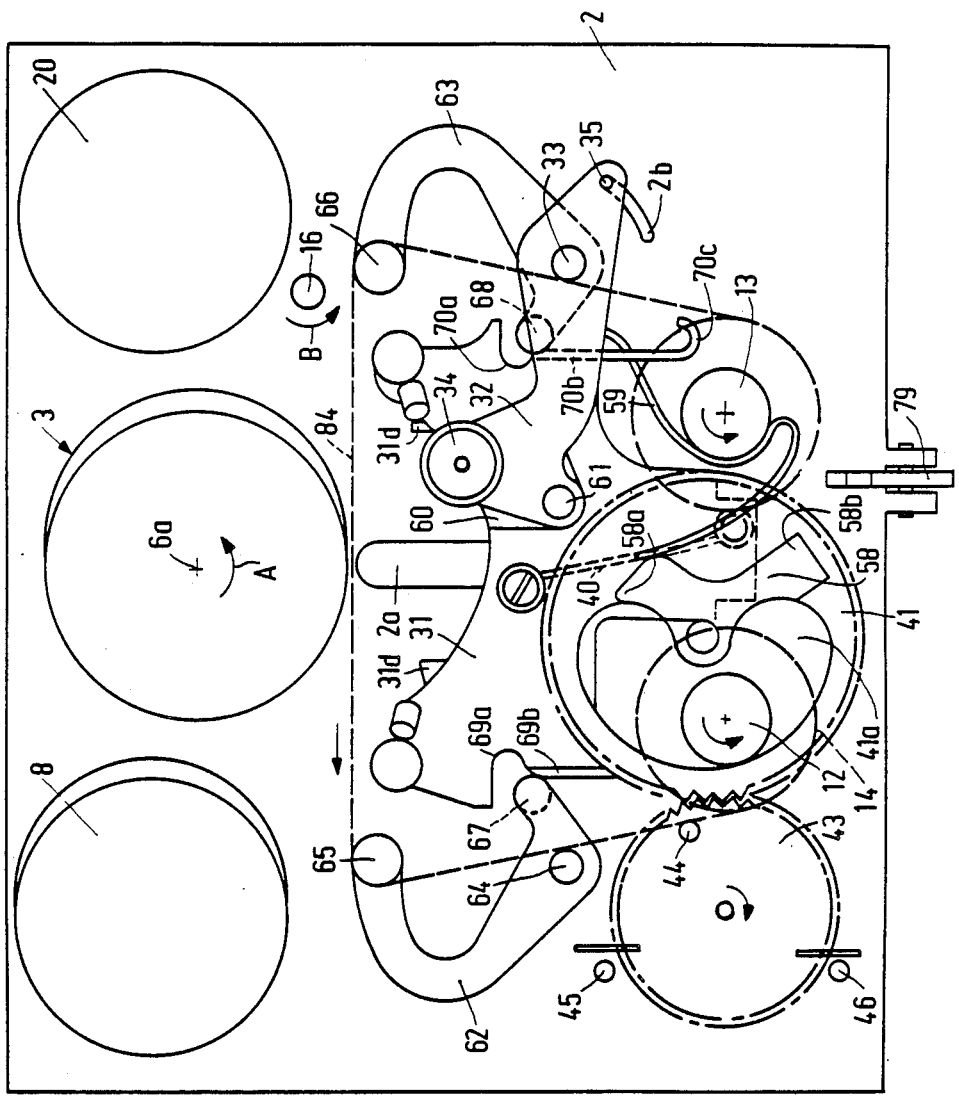
FIG. 4 is a plan view similar to FIG. 2, showing the apparatus in a fast-wind position.

Near the side which faces the drum system 3, the sliding plate 31 is connected to a first spring coupling 40 whose other end is connected to a servo wheel 41 which is mounted on a shaft 42 which is journaled in the deck plate 2. The servo wheel 41 is situated above the sliding plate 31. Thus, by means of the first spring coupling 40 the sliding plate 31 can be moved from an initial position shown in FIGS. 1 and 2 to two fast-wind positions (of which one fast-wind position is shown in FIG. 4) and also to an end position, shown in FIGS. 6, 7 and 9 to 12, which position corresponds to the normal operating position of the apparatus. The servo wheel 41 has an aperture 41a through which the winding spindle 12a extends and which aperture makes it possible for the zero wheel 41, which has a comparatively large diameter, to be situated largely between the winding spindles 12 and 13. The servo wheel 41 is in mesh with a gear wheel 43, which carries a switching pin 44 which acts against a reset switch 45 in the stop position shown in FIG. 2. In the operating position shown in FIG. 7 the switching pin 44 abuts against a reset switch 46. In a manner not shown, the switches 45 and 46 are electrically connected to an electronic circuit, which also actuates an electromagnet 47 (see FIG. 3). The electromagnet 47 is connected to a switching rod 48, whose remote end is connected to a shaft 49 on which a wheel 50 is journalled. Further, the shaft 49 is connected to a tension spring 51, which is situated in line with the switching rod 48 and which, viewed in FIG. 3, tends to pull the wheel 50 towards the bottom left. In the stop position of the apparatus the circumference of the wheel 50 abuts against an abutment wall 52 on the underside of the deck plate 2. When electromagnet 47 is energized by the electronic circuit, the wheel 50 is moved to the top-right viewed in FIG. 3 against the force of the spring 51, so that a driving connection is established between the motor shaft 8a of the motor 8 and the gear wheel 53 to which the wheel 50 is coupled. The gear wheel 53 is rigidly connected to the comparatively small coaxial gear wheel 54, which is in mesh with a gear wheel 55. In its turn, the gear wheel 55 is in mesh with a gear wheel 56 which is fixedly connected to the gear wheel 43 (FIGS. 1 and 2). Thus, when the electromagnet 47 is being energized, a transmission is established between the motor shaft 8a of the motor 8 and the servo wheel 41. By means of this transmission the sliding plate 31 can be shifted from the initial position to the respective fast-wind positions and to the end position, and by reversing the direction of rotation of the motor 8 the sliding plate can be moved in the opposite direction. In the end position the switching pin 44 abuts against the reset switch 46 and (as stated previously) in the initial position the pin abuts against the reset switch 45. The position of the gear wheel 53 is detected by a counter 57, which may comprise a photocell or a Hall element. By coupling it to the electronic circuit the counter can thus establish over which distance the sliding plate 31 has been shifted towards the drum system after starting from the position shown in FIG. 2. This is important in particular for the fast-wind positions, of which one position is shown in FIG. 4. By constructing the electronic circuit as a microprocessor the initial position and the end position of the sliding plate 31 can be detected accurately by means of the reset switches 45 and 46.

Above the sliding plate 31 the shaft 42 carries a bell-crank lever 58 (see FIG. 2) having a first end 58a which in the initial position of the sliding plate is pressed against a second spring coupling in the form of wire spring 59. As a result of the rotation of the servo wheel 41 the second end 58b of the bell-crank lever 59 acts against the wire spring 58, so that the wire spring exerts a force on the pressure roller lever 32, thereby urging the pressure roller 34 against the capstan 16 with spring force in the position shown in FIG. 7.

In the upper surface of the sliding plate 31 a V-shaped channel 60 is formed, whose walls constitute control means for a pin 61 arranged on the pressure-roller lever 32. Thus, when the sliding plate 31 is shifted from the initial position to the end position, i.e. from the position illustrated in FIG. 2 to that in FIG. 7, the pressure roller lever 32 is moved through the position shown in FIG. 4, in which the pin 61 is situated in the vertex of the V-shaped channel 60. Thus, the channel 60 provides an automatic guidance of the pressure-roller lever 32 with the pressure roller 34 towards the capstan 16. As a result of the coupling between the pressure-roller lever 32 and the arm 37 via the pin 35, the guidance provided by the channel 60 during the movement of the sliding plate 31 also ensures that the gear wheel 36 is brought into the position shown in FIG. 8.

Figure 7:
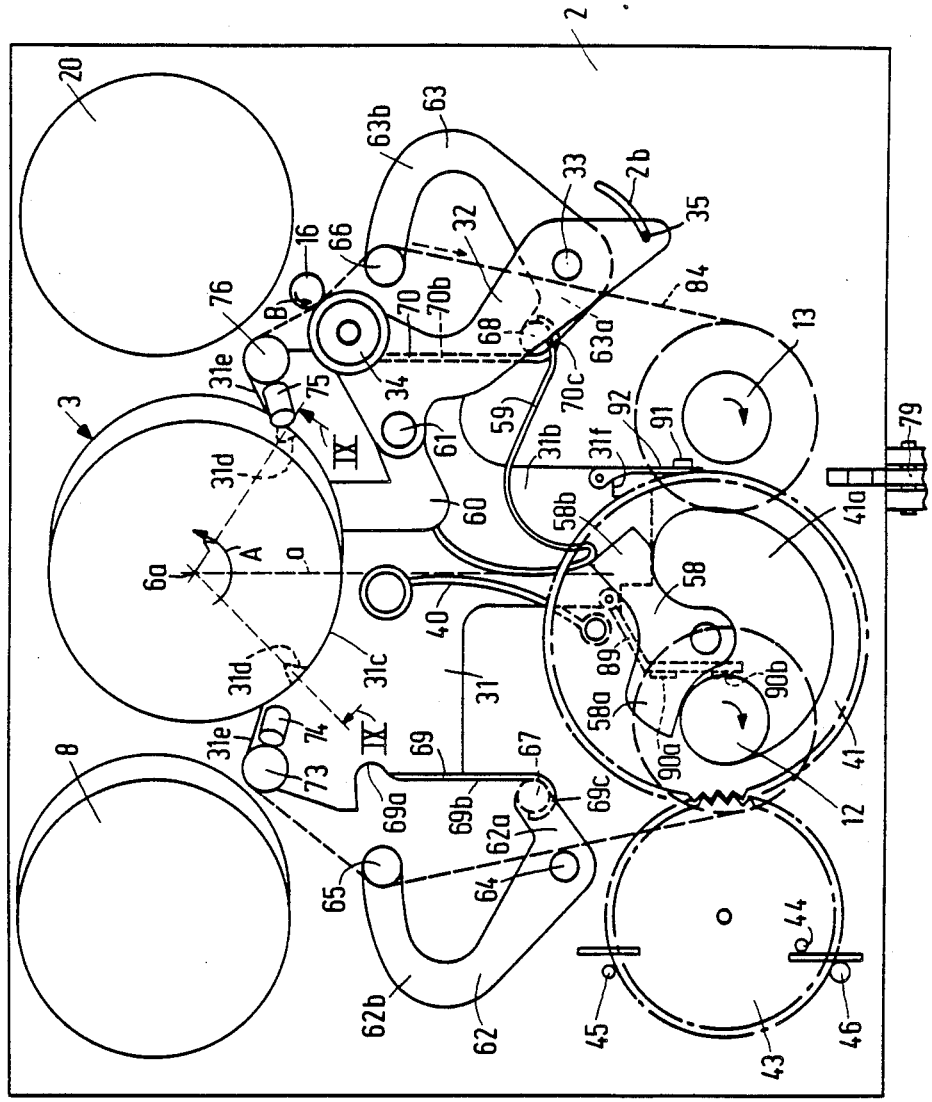
FIG. 7 is a plan view similar to FIGS. 2 and 4 but showing the apparatus in the normal operating position.

Referring again to FIGS. 1 and 2, deck plate 2 further carries a left-hand pivotal arm 62 in FIG. 2 being pivotable about a pivot 64 and the right-hand pivotal arm 63 pivotable about the pivot 33 together with the pressure-roller lever 32. The two pivotal arms are arranged mirror-symmetrically relative to a plane of symmetry a between the winding spindles 12 and 13 (see FIG. 7) and are spaced equidistantly from these winding spindles, the longitudinal axis 2aa of the slot 2a being contained in this plane. On opposite sides of the pivotal axis each pivotal arm comprises two arm portions 62a, 62b and 63a, 63b. At the free ends of the arm portions 62b and 63b respectively, the pivotal arms carry tape guides 65 and 66 respectively, which are each provided with a cylindrical guide surface. At the free ends the arm portions 62a and 63a carry pins 67 and 68 respectively. The sliding plate 31 is provided with control means comprising guide edges 69 and 70 respectively which are situated on the side walls of the sliding plate 31 mirror-symmetrically relative to the plane of symmetry a. As is shown in FIG. 2, the guide edges have cylindrically curved portions 69a and 70a respectively on the sides facing the drum system 3. In the positions of the pivotal arms 62 and 63 as shown in FIG. 2 (the stop position of the apparatus) the pins 67 and 68 respectively abut against the portions 69a and 70a respectively and thus occupy stable positions. Adjoining the portions 69a and 70a the guide edges have profiles 69b and 70b respectively, against which the pins 67, 68 abut in the position illustrated in FIG. 4, namely a fast-wind position of the apparatus. The profiles 69b and 70b are straight guide portions adjoining outwardly bent end portions 69c and 70c respectively. These end portions together with the last parts of the straight guide portions are situated on projecting limbs of the sliding plate 31, which limbs have such dimensions that the bent end portions 69c and 70c are elastically deflexible to a small extent. As is illustrated in FIG. 7, the end portions 69c and 70c ensure a stable positioning of the guides 65 and 66 respectively in the operating position of the apparatus.

In the position illustrated in FIG. 2 the portion 31b of the sliding plate 31 is situated in the area between the two winding spindles 12 and 13. At the front side facing the drum system 3 the sliding plate further has a wall 31c which is substantially concentric with the drum system. Referring to FIG. 7, wall 31c extends through an arc of approximately 90° between stationary positioning means in the form of projecting portions 31d arranged on the sliding plate mirror-symmetrically relative to the plane of symmetry a. On opposite sides the wall 31c adjoins front portions 31e of the sliding plate which are disposed mirror-symmetrically relative to the plane of symmetry a. As is also shown in FIG. 2, these front portions 31e carry basic portions 71, 72 respectively, two tape guides 73, 74 and 75, 76 respectively being rigidly connected to each basic portion. Each tape guide has a cylindrical circumferential surface, the axes of the tape guides 73 and 76 extending substantially perpendicularly to the deck plate 2 and the axes of the tape guides 74 and 75 extending substantially parallel to the axis of rotation 6a of the head disk 6.

In the lower drum 4 there is provided a positioning element constituted by a recess in the form of a circumferential coaxial groove 77 in the outer wall FIGS. 11 and 12). As an alternative separate non-circumferential recesses may be formed in the outer wall of the lower drum 4. The advantage of the groove shape is that it can be formed easily and accurately in the outer wall of the lower drum 4. In the normal operating condition of the apparatus, in which the sliding plate 31 is in the end position, the projecting portions 31d abut against the wall of the groove 77 (see FIG. 9), so that a correct positioning of the tape guides relative to the drum system is ensured as a result of the rigid connection between the projecting portions 31d and the tape guides 73 to 76. The wire spring 40 ensures that the projecting portions 31d are pressed firmly into the groove 77. It is to be noted that in the embodiment shown in FIGS. 1–9 the portions 31d are situated at different levels relative to the deck plate 2 on account of the coaxial shape of the groove 77 (see FIG. 9). If as alternative positioning elements two recesses are formed in the outer wall of lower drum 4 at the same level the portions 31d may also be situated at the same level.

Remote from the drum system, the portion 31b of the sliding plate 31 may carry an adjusting element comprising a set-screw 78 whose axis is preferably situated in the plane of symmetry a (see FIG. 10). By adjusting the set-screw 78, the positions of the various tape guides can be influenced because the projecting portions 31d can be tilted in the groove 77 about the connecting line b between two portions 31d by tightening or loosening the screw. The projecting portions 31d and the groove 77 are prism-shaped in a cross-section taken perpendicularly to the deck plate 2, which is important for a smooth engagement of the walls of the projecting portions and those of the groove (see FIG. 9). Suitably, the sliding plate 31 is an integrated unit together with the projecting portions 31d and the tape guides 73, 74, 75 and 76, this unit being preferably made of a thermosetting plastics. This has the advantage that the mould used for the manufacture of this unit accurately defines the various dimensions. Thus, tolerances of the various parts of the sliding plate are minimized.

Referring again to FIGS. 1 and 2, the rear portion 31b of the sliding plate 31 has a latching wall 31f, which actuates a latching member 79 which latches a cassette holder 80 arranged above the deck plate 2. The latching member 79 is pivotally connected to the deck plate and is urged against the latching wall 31f by a tension spring 79a in the stop position of the apparatus. In this position of the latching member 79 the cassette holder 80 is not latched. A magnetic-tape cassette, not shown, can then be inserted into the holder 80, after which the holder is moved downwards to move the cassette with the tape reels 81 and 82 towards the deck plate 2 until the reels 81 and 82 are engaged by the winding spindles 12 and 13 respectively. For an example of such a cassette holder and the lifting device cooperating therewith reference is made to U.S. application Ser. No. 617,067 (allowed) filed 6-4-84. Alternatively, the holder 80 may be constructed as a holder which is pivotably connected to the deck 1. By sliding the sliding plate 31 towards the end position the latching member 79 is pivoted under the influence of the spring 79a, thereby latching the cassette holder.

As shown in FIG. 3, the lower surface of the sliding plate carries brake means in the form of a member 83 with two pointed end portions 83a which engage with the teeth of the fast-wind idlers 14 and 15a in stop position. In this way the winding spindles 12 and 13 are blocked in the stop position. By moving the sliding plate 31 towards the drum system the portions 83a are disengaged from the fast-wind idlers, so that these idlers can be driven without any obstruction.

Alternatively, the axis of the drum system 3 and the axis of rotation 6a of the head disk 6 may extend perpendicularly to the deck plate 2, which situation is illustration in FIGS. 10–12. The tape guides 74 and 75 should then also occupy perpendicular positions and the tape guides 73 and 76 should be inclined. In the case of corresponding oblique positions of the tape guides 65 and 66 and the magnetic-tape cassette, the path of the magnetic tape 84 around the drum system 3 will then be similar to the situation illustrated in FIGS. 1–9. An advantage of this alternative construction is that the projecting portions 31d of the sliding plate 31 can be situated at the same level relative to the deck plate 2.

Before the magnetic tape apparatus in accordance with the invention can be put into use a magnetic-tape cassette with tape reels 81 and 82 should be made to engage the winding spindles 12 and 13 by means of the cassette holder. The magnetic-tape cassette used here is of the kind disclosed in U.S. Pat. No. 4,576,345, herewith incorporated by reference). After lowering of the cassette it is positioned on spring-loaded locating pins 85, of which one pin is shown in FIG. 1. The magnetic tape 84 contained on the reels 81 and 82 extend over tape guides 88 of the cassette, which are shown in phantom in FIGS. 1 and 2. After application of the magnetic-tape cassette the tape guides 65 and 66, the pressure roller 34, and the tape guides 73, 74, 75 and 76 are separated from the drum system 3 by the front part of the magnetic tape 84. This is possible because the cassette housing is constructed so that space is available for taking up the parts. In this respect it is important that as a result of the action of the first control means 69, 70 the tape guides 65 and 66 occupy the correct positions and also that as result of the action of the second control means 60 the pressure-roller lever 32 is pressed against a step 86 (FIG. 1) and thereby keep the pressure roller 34 positioned correctly. In this stop position the magnetic tape is clear of the pressure roller 34, the tape guides 65, 66 and the tape guides 73 to 76.

When the apparatus is actuated the motor 8 is started, causing the head disk 6 to rotate in the direction indicated by the arrow A (FIG. 2). If the electromagnet 47 is now energized the servowheel 41 begins to rotate in a direction as indicated by the arrow C, causing the brake member 83 to become disengaged from the fast-wind idlers 14 and 15a and the casette holder 80 to be latched. The pin 28a is guided in the branch 31aa and remains in this branch for the time being, and the pivotal arms 62 and 63 are pivoted as a result of the guide edges 69 and 70 respectively, so that the magnetic tape 84 is taken over from the guides 88 by the tape guides 65 and 66 but remains clear of the drum system 3. As the pin 61 traverses the first branch of the V-shaped groove 60, the pressure roller 32 remains situated against the stop 86 in its initial position. Depending on the selected actuating button of the apparatus the sliding plate is now moved into a position in which the pin 28a is still situated in the branch 31aa or the sliding plate 31 is moved slightly further into the position as shown in FIGS. 4 and 5, in which the pin 28a is situated in the branch 31ab. In the first fast-wind position the gear wheel 26 meshes with the fast-wind idler 15a as shown in FIG. 3, whilst in the second fast-wind position the gear wheel 30 is in mesh with the fast-wind idler 14. Thus, in the first fast-wind position the magnetic tape 84 is wound rapidly towards the winding spindle 13 and in the second fast-wind position shown in FIGS. 4 and 5 it is wound towards the winding spindle 12. Fast winding is achieved in that at the end of the movement of the sliding plate 31, after the energization of the electromagnet 47 and after rotation of the servo wheel 41 has consequently stopped, the drive motor 20 is started, causing the pulley 21 to rotate in the direction indicated by the arrow D. This rotation causes the capstan 16 to rotate in the direction indicated by the arrow B, but in this direction, as stated previously, the magnetic tape is clear of the pressure roller 34 and the capstan 16. For fast winding it is important that as a result of the shape of the cassette housing the magnetic tape 84 between the wheels 81 and 82 is not in contact with any parts of the cassette housing (such as the guides 88). During fast winding the tape path is influenced only by the tape guides 65 and 66. The correct position of the sliding plate 31 for fast winding in either direction is determined by the position-detection means 57 which cooperates with the gear wheel 53 (FIG. 3). This position could also be detected by means of wiper contacts which directly detect the position on the sliding plate 31.

If as a result of the energization of the electromagnet 47 the sliding plate is moved from the initial position into the end position as shown in FIGS. 6 to 12, the V-shaped groove 60 causes the pressure-roller lever 32 to be pivoted to the end position, and under the influence of the spring 59 the pressure roller 34 is pressed against the captan 16 (see FIG. 7). During this pivotal movement the arm 37 is pivoted via the pin 35, so that the gear wheel 36 is in mesh with the normal-mode idler 15b and the tape is wound onto the winding spindle 13 via the winding friction, not shown. When the sliding plate 31 is moved to the end position it is important that the magnetic tape 84, which has initially been led out of the housing by the guides 65 and 66, is now further guided by the tape guides 73 and 76 and is wrapped around the drum system through an angle of approximately 90°. This operation is referred to as "threading-in" of the magnetic tape. At the end of the movement the tape guides 74 and 75 play an important part in this operation. As a result of the inclination of the axis of rotation 6a and of the axis of the drum system the tape is now wrapped around the wall of the drum system along a helical path. This enables inclined tracks to be recorded on or to be read from the magnetic tape 84 by means of the magnetic heads 7 as the head disk 6 rotates. If the tape is thus wrapped around the drum system it is important that the tape guides 73 to 76 are aligned accurately relative to the drum system. This is achieved by means of the projecting portions 31d in conjunction with the prism-shaped groove 77 in the lower drum 4. The tape path may be corrected by means of the set screw 78, but if accurately manufactured parts, for example injection-moulded parts, are employed this adjustment may be omitted. The end position of the servo wheel 41 is defined in that the switching pin 44 on the gear wheel 43 abuts against the reset switch 46. In this end position the servo wheel 41 presses the projecting portions 31d firmly into the groove 77 via the spring 40, and the spring 59 exerts such a pressure on the pressure-roller lever 32 that the pressure roller 34 is pressed against the capstan 16 with a predetermined force. At this instant the apparatus is in the normal operating position and the signals can be recorded or read.

It is to be noted that the sliding plate 31 may also carry a resilient arm 89 (FIG. 7) provided with friction means comprising two mutually spaced felt elements 90a and 90b, which can each be pressed against the winding spindle 12, in order to exert a counter-torque on the winding spindle 12 to keep the tape taut when the magnetic tape 84 is unwound. In the first fast-wind position the felt element 90a is pressed against the winding spindle 12 and in the normal operating position the felt element 90b is pressed against this spindle. The position of the felt element 90a relative to the sliding plate 31 is such that their second fast-wind position, when the tape is taken up by means of the winding spindle 12, this felt element 90a is clear of the winding spindle. Only in the second fast wind position a felt element 91 arranged on a resilient arm 92 on the sliding plate 31 is pressed against the winding spindle 13 to exert a counter-torque on this winding spindle. This selective application of the felt elements is possible by moving the sliding plate 31 to the various positions.

In addition to the correct positioning of the tape guides 73 to 76 relative to a drum system 3 the magnetic-tape apparatus in accordance with the invention has the advantage that the sliding plate 31 can be integrated with various parts required for controlling the various apparatus functions. As described hereinbefore, the sliding plate 31 is integrated with means for controlling the drive of the winding spindles, controlling the pressure-roller lever, controlling pivotal arms carrying tape guides, controlling, the brake means, controlling a latching means for the cassette holder, and automatically positioning the tape guides. Further, the sliding plate 31 may carry the friction means for exerting a counter-torque on the respective winding spindle. A great advantage of this is that the control logic of the apparatus is locked directly to the position of the sliding plate 31. Thus, in each position of the sliding plate the tape guides occupy positions which correspond accurately to the selected apparatus function. This makes the magnetic-tape apparatus in accordance with the invention suitable for many uses an renders the apparatus very suitable for mass production. One possible use is the recording and/or reproduction of digital audio signals, for which a compact magnetic-tape apparatus is desirable.

It is to be noted that alternatively the servo wheel 41 may be driven by a separate motor, in which case the electromagnet 47 and the wheel 50 and the wheels driven thereby may be dispensed with. This separate motor is switched on and off and, as the case may be, its direction of rotation is reversed by the electronic circuit.

What is claimed is:

1. A magnetic tape threading apparatus for leading a length of magnetic tape from a cassette to a magnetic head which reads or records the tape, comprising a deck, a cylindrical drum system on said deck, said system having a rotating magnetic head and a non-rotating drum section, said non-rotating drum section incorporating a positioning element, a supporting member mounted on said deck for rectilinear movement relative thereto toward and away from said drum system, said supporting member occupying an end position when closest to said drum system, means carried by said support member for leading a length of magnetic tape toward said drum system when said member is moved theretoward, at least two mutually spaced tape guides fixed to the supporting member, said tape guides serving to wrap the magnetic tape around a part of the circumference of the drum system when the supporting member is in the end position, positioning means carried by said supporting member, said positioning means cooperating with said positioning element to position the tape guides relative to the drum system when the supporting member is in the end position.

2. A magnetic tape threading apparatus as in claim 1 wherein said positioning element is a recess in the surface of the non-rotating drum section, said positioning means comprises two projecting portions on the supporting member and facing said drum system, said projecting portions engaging the recess when the supporting member is in the end position.

3. A magnetic tape threading apparatus as in claim 2 wherein the projecting portions and the recess are prism-shaped.

4. A magnetic tape threading apparatus as in claim 2 wherein the recess is a circumferential channel.

5. A magnetic tape threading apparatus as in claim 2 wherein the projecting portions are urged into the recess under spring force.

6. A magnetic tape threading apparatus as in claim 2 wherein the projecting portions are located in the direct vicinity of respective tape guides.

7. A magnetic tape threading apparatus as in claim 2 wherein the supporting member carries an adjusting element remote from the drum system, said adjusting element serving to pivot the supporting member about the connecting line between the projecting portions when the supporting element is in the end position.

8. A magnetic tape threading apparatus as in claim 2 wherein the supporting member is injection molded plastic, said projecting portions and tape guides being molded integrally therewith.

9. A magnetic tape threading apparatus as in claim 1 wherein the drum system comprises an upper drum and a lower drum, wherein the non-rotating drum section is the lower drum.

10. A magnetic tape threading apparatus as in claim 1 wherein the supporting member has a curved wall facing the drum system, said curved wall being substantially concentric with the drum system when the supporting member is in the end position, said positioning means being fixed on said curved wall.

* * * * *